United States Patent [19]

Maljushevsky et al.

[11] 3,997,468
[45] Dec. 14, 1976

[54] METHOD OF CREATING HIGH AND SUPERHIGH PRESSURE AND AN ARRANGEMENT FOR DISPERSING NON-METALLIFEROUS MATERIALS

[76] Inventors: Pavel Petrovich Maljushevsky, prospekt Oktyabrsky, 17a, kv. 41; Georgy Grigorievich Gorovenko, ulitsa Skorokhodova, 54, kv. 20; Jury Alexandrovich Blagoverov, ulitsa Terrasnaya, 12, kv. 40, all of Nikolaev, U.S.S.R.

[22] Filed: Feb. 27, 1974

[21] Appl. No.: 446,511

[52] U.S. Cl. .................................. 252/314; 204/10; 204/156; 252/359 B; 313/155; 313/231.4; 315/111.6
[51] Int. Cl.² ..................... B01J 13/00; B01F 3/12
[58] Field of Search .......... 252/314, 359 B; 204/10, 204/156; 315/111.6; 313/155, 231.4

[56] References Cited
UNITED STATES PATENTS

| | | | |
|---|---|---|---|
| 1,992,938 | 3/1935 | Chambers et al. | 252/314 |
| 2,314,561 | 3/1943 | Skowronski | 252/314 X |
| 2,986,506 | 5/1961 | Friel et al. | 204/156 |

*Primary Examiner*—Richard D. Lovering
*Attorney, Agent, or Firm*—Haseltine, Lake & Waters

[57] ABSTRACT

Non-metalliferous materials are dispersed in an arrangement comprising at least two coaxial plasma accelerators each provided with an inlet duct for feeding a liquid stream with the material to be treated into the accelerator housing. The accelerators are positioned with their axes intersecting so that a superpressure chamber is formed by the accelerator housing at the intersection of the axes. The chamber has a central outlet duct for discharging the dispersed material.

The invention provides for creating and efficiently using high and superhigh pressures the magnitude of which, at a considerable distance from the zone where initial pressures are build up, is greater than the magnitude of the initial pressures.

6 Claims, 1 Drawing Figure

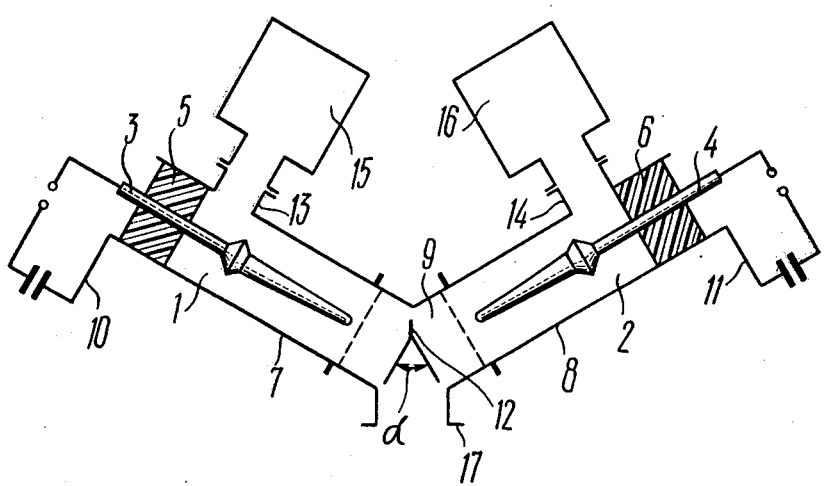

METHOD OF CREATING HIGH AND SUPERHIGH PRESSURE AND AN ARRANGEMENT FOR DISPERSING NON-METALLIFEROUS MATERIALS

This invention relates to electrical engineering applications employing the phenomenon of high and superhigh pressures build-up in a liquid by the action of an impulsive electric discharge. More particularly, the invention relates to methods of creating high and superhigh pressures and apparatus for dispersing non-metalliferous materials by means of high and superhigh pressures created by said methods.

The invention can be used with advantage in metal forging and pressing applications, in emulsification of various materials and, more particularly, in the mining industry where it can be employed for dispersing materials in concentration applications.

It is known that high and superhigh pressures in a liquid medium can be created by means of an impulsive electric discharge through the liquid. This effect essentially results from the ability of impulsive discharges through a liquid to produce a dense plasma the temperature of which may be as high as $10^{40}$ K in the initial stage of the discharge, varies insignificantly during the charge and falls off after the termination of the charge.

In this case the liquid prevents the discharge channel from expanding, whereby the density of the energy released in the channel is increased with consequent increase in the temperature and pressure of the plasma in the channel.

The action of discharges causes considerable displacements in the liquid, leading to formation of a cavity which subsequently collapses. A single impulsive electric discharge causes an electrohydraulic shock which is essentially a combination of two hydraulic shocks, viz., a main shock produced while a cavity is forming in the liquid and a cavitation shock produced by the collapse of the cavity. The cycle of these two shocks can be repeated, following the frequency of the discharges. The pressure created by the electrohydraulic shock increases with increase in the density of the liquid, the power of the pulse and the steepness of the pulse front. This method of creating high and superhigh pressures can be carried into effect by means of any electrical arrangement generating a pulse with a sufficiently steep front and consisting generally of a charging device, a source of high-tension direct current and an accumulating device in the form of pulse capacitors capable of instantaneously transmitting the stored energy through connecting lines to electrodes for discharge of a spark across them through the liquid.

A powerful spark discharge through the liquid, followed by the introduction of the capacitor-stored energy into the spark discharge channel, gives rise to an impulsive pressure build-up, the maximum pressure in the discharge channel rising as high as $10^3$ atm.

It is also known that high and superhigh pressures in a liquid medium can be created by employing an impulsive discharge to evaporate in the liquid current-carrying elements constructed in the form of a wire, a strip or a tube. Rapid evaporation (heat explosion) of the current-carrying element connected across the electrodes causes an impulsive rise of the pressure of the liquid contained in the vessel accommodating the electrodes, whereby an electrohydraulic shock is produced.

The evaporative current-carrying element may be constructed in the form of a conically or spherically wound coil or may be located inside a spherical space in a reflector, in either case providing for a cumulatively focussed hydraulic shock.

The methods discussed above suffer from the disadvantage that they permit creating high and superhigh pressures within a limited area adjacent to the discharge channel. Another disadvantage is that the shock waves created by these methods have a directional effect and therefore the pressure at the shock-wave front sharply diminishes with distance. Thus, with a maximum channel pressure of 1600 atm, the pressure built by a compression wave at a distance of 100 cm from the discharge is about 8 atm.

This disadvantage is considerably obviated by producing impulsive electric discharges in arrangements which permit orientating the direction of the electrohydraulic shocks whereby they can be augmented in the desired direction. Among such arrangements are coaxial plasma accelerators operating on the principle of forming a discharge channel between a rod-shaped center electrode and an outer annular electrode. This discharge channel may be referred to as a plasma piston. The discharge current flowing axially between the electrodes, one of which is a rod positioned coaxially with the accelerator and the other is a cylindrical housing of the accelerator, interacts with a concentric magnetic field set up by the current flowing through the center electrode. This interaction gives rise to a ponderomotive force which acts along the accelerator axis and accelerates the plasma, throwing it out of the area between the electrodes under the influence of the magnetic field which acts like a piston. This phenomenon is well known in the shock-wave physics and high-temperature hydrodynamics and finds use in accelerating charged particles. As the plasma piston makes a directional movement in a passage filled with liquid and confined by walls, the liquid is accelerated. As is known from electrophysics, when energy is being released intensively, the rate of expansion of the discharge channel may become comparable with the velocity of sound and may even exceed it. Under such conditions a compression wave propagating in liquid converts into a shock wave in close proximity to the discharge channel or the discharge can even directly produce a shock wave.

A point of importance in connection with the arrangement under consideration is that the directional shock wave is plane and, therefore, slowly decaying, it propagates over considerable distances through the medium.

The employment of said coaxial plasma systems for working various materials has shown their high ability to convert electrical energy directly into mechanical work by virtue of creating high-velocity liquid streams and high pressure at the shock-wave front.

However, in a number of cases encountered in working materials in liquid, transferring liquid or acting upon objects in a liquid, particularly in continuously operating devices, a need arises for a sharp increase in the pressure at the shock-wave front in the working area located some distance from the zone where the shock waves are originated. None of the methods and arrangements discussed above can meet this requirement.

It is an object of the present invention to provide a method of creating high and superhigh pressures at a considerable distance from the zone where initial pressures are produced, the first-named pressures being greater than the initial pressures.

It is a further object of the present invention to provide an arrangement for effectively dispersing non-metalliferous materials by said method of producing high and superhigh pressures.

These objects are achieved by providing a method of creating high and superhigh pressures in a liquid medium by means of coaxial plasma systems wherein a high-velocity liquid stream and a shock wave are produced by interaction of a high-voltage impulsive discharge through the liquid and a magnetic field set up by electric current flowing through center electrodes provided in said coaxial plasma systems. According to the invention, said coaxial plasma systems are positioned with their axes intersecting at an angle chosen so that in the zone of collision of the high-velocity streams and shock waves produced in each of the systems, the maximum pressure build-up is obtained at the front of the resultant shock wave and the liquid flow is accelerated in the direction of the joined stream.

In this method, shock waves produced in the plasma systems move toward the intersection of the axes thereof, where they collide, forming a zone wherein the pressure at the front of the resultant shock wave is three to eight times greater than the pressure exerted by the initial shock waves.

These objects are also achieved by providing an arrangement for dispersing non-metalliferous materials by said method of creating high and superhigh pressures. According to the invention, this arrangement has at least two coaxial plasma accelerators positioned so that their axes intersect at an angle $\alpha$, which plasma accelerators have their interior spaces interconnected and are provided with inlet ducts for feeding pulp consisting of a non-metalliferous material and a liquid, said inlet ducts being positioned on cylindrically shaped accelerator housings upstream of the zone of electric discharge between said housings and positive electrodes mounted therein. The arrangement also has a superpressure chamber which is formed by the walls of said housings at the intersection of the axes of said accelerators and is provided with a central outlet duct for discharging the dispersed material in the direction of the joined liquid stream.

The electrohydraulic dispersion effect of the arrangement constructed according to the present invention is two to three times greater than that of the dispersing arrangements known in the art hitherto.

Now the invention will be described in detail with reference to the accompanying drawing which schematically shows in the sole FIGURE thereof the arrangement for dispersing non-metalliferous materials according to the invention.

The method of creating high and superhigh pressures according to the present invention consists in producing a high-velocity stream and a shock wave in at least two coaxial plasma systems. Said high-velocity stream and shock wave are produced by the interaction of a high-voltage impulsive discharge through a liquid contained in each system and a magnetic field set up by electric current flowing through a center electrode provided in each of said systems.

The coaxial plasma systems are positioned with their axes intersecting at an angle $\alpha$ chosen so that in the zone of collision of the high-velocity streams and shock waves produced in each of said systems, a maximum pressure build-up is obtained at the front of the resultant shock wave and the liquid flow is accelerated in the direction of the joined stream.

We have found that the maximum pressure build-up is obtained if the angle $\alpha$ between the axes of the coaxial plasma systems is within 70°.

The above-described method of producing high and superhigh pressures can be used with particular advantage in the cases where superpressures are required to effectively disperse non-metalliferous materials.

According to the present invention, the arrangement for dispersing non-metalliferous materials comprises two coaxial plasma accelerators 1 and 2 positioned so that their axes intersect at an angle $\alpha$ of not more than 70°. Each of the accelerators 1 and 2 has an axial center electrode 3 and 4 mounted by means of an insulator 5 and 6 in a cylindrically shaped accelerator housing 7 and 8. A superpressure chamber 9 is formed by the walls of the housings 7 and 8 at the intersection of the axes of accelerators 1 and 2. The electrodes 3 and 4 and the housings 7 and 8 are connected to external electric circuits 10 and 11.

The chamber 9 has a zone 12 where a sharp pressure build-up occurs at the shock-wave front.

The housings 7 and 8 have inlet ducts 13 and 14 for feeding pulp in the form of a non-metalliferous material and a liquid from pulp sources 15 and 16 into the accelerators 1 and 2. It will be noted that the inlet ducts 13 and 14 are positioned on the housings 7 and 8 upstream of the zone of discharge between the positive electrode and the housing.

The superpressure chamber 9 has a central outlet duct 17 for discharging the dispersed material in the direction of the joined liquid stream.

During the operation of the dispersing arrangement, pulp is fed from the sources 15 and 16 through the inlet ducts 13 and 14 into the accelerators 1 and 2.

The external circuits 10 and 11 each simultaneously supply a high-voltage pulse to the electrodes 3 and 4 and discharge occurs in the accelerators 1 and 2, giving rise to a phenomenon referred to hereinbefore as the plasma piston. Discharge current flows radially between the center electrodes 3 and 4 and the cylindrically shaped housings 7 and 8 which serve as electrodes, interacting with concentric magnetic fields set up by the current flowing through the center electrodes 3 and 4. This interaction produces a ponderomotive force which acts along the axes of the accelerators 1 and 2, accelerating the plasma and thereby forcing the pulp toward the center of the superpressure chamber 9 and giving rise to a powerful plane shock wave in the pulp. The shock waves and high-velocity pulp streams produced in each of the accelerators collide in the region of the central plane of the superpressure chamber 9, producing in the zone 12 a sharp pressure build-up supplemented by an axial cumulative action of the colliding shock waves.

Thus the non-metalliferous material is intensively dispersed in the superpressure chamber due to sharp variation in the pressures and the velocities of the streams carrying the particles of the material. The dispersed pulp is discharged through the outlet duct 17 for subsequent dehydration and drying.

The invention increases the effectiveness of electrohydraulic dispersion and provides for creating highly efficient equipment for dispersing various materials in the form of pulp or in lumps. The method and arrangement described herein can also be used with advantage for working metals by subjecting them to the action of colliding shock waves. Such a method of metal working can be used, for example, for strengthening, deformation or removing residual stresses.

What is claimed is:

1. A method of creating high and superhigh pressures in a liquid medium by means of coaxial plasma systems comprising producing a high-velocity liquid stream and a shock wave by interaction of a high-voltage impulsive discharge through the liquid and a magnetic field set up by electric current flowing through center electrodes provided in said coaxial plasma systems, which coaxial plasma systems are positioned with their axes intersecting at an angle chosen so that in the zone of collision of the high-velocity streams and shock waves produced in each of said systems a maximum pressure build-up is obtained at the front of the resultant shock wave and the liquid flow is accelerated in the direction of the joined stream.

2. An arrangement for dispersing non-metalliferous materials by means of high and superhigh pressures, comprising at least two coaxial plasma accelerators each of which includes a cylindrically shaped housing with a positive center electrode mounted coaxially therein and an inlet duct for feeding pulp in the form of a non-metalliferous material and a liquid, said inlet duct being positioned on said housing upstream of said positive electrode so that the magnetic field set up by the current flowing through said electrode interacts with the radial discharge current generated by a high-voltage impulsive discharge through the pulp already contained in said housing, said coaxial plasma accelerators being positioned relative to each other so that their housings form a superpressure chamber at the intersection of the axes of said accelerators, said superpressure chamber having a central outlet duct for discharging the dispersed pulp in the direction of the joined liquid stream.

3. A method as claimed in claim 1 wherein liquid is introduced separately into each plasma system for flow in stream up to the zone of collision.

4. A method as claimed in claim 1 wherein each plasma system is separately energized to produce the respective high velocity liquid stream and shock wave.

5. Apparatus as claimed in claim 2 wherein each plasma accelerator includes a respective independent electrical power supply means.

6. Apparatus as claimed in claim 2 wherein said housings form an acute angle therebetween.

* * * * *